Sept. 29, 1925.

J. A. WRIGHT

PUMP

Filed Jan. 3, 1924

J. A. Wright
Inventor:

By C. A. Snow & Co.
Attorneys

Patented Sept. 29, 1925.

1,555,175

UNITED STATES PATENT OFFICE.

JESS A. WRIGHT, OF HUNTINGTON BEACH, CALIFORNIA.

PUMP.

Application filed January 3, 1924. Serial No. 684,230.

*To all whom it may concern:*

Be it known that I, JESS A. WRIGHT, a citizen of the United States, residing at Huntington Beach, in the county of Orange and State of California, have invented a new and useful Pump, of which the following is a specification.

This invention relates to a pump designed for use in oil wells and also for hoisting water in deep wells, one of the objects of the invention being to provide a pump the piston of which has removable rings whereby wear upon the parts can be taken up automatically.

A further object is to provide a pump having a telescopic connection between the piston and the casing of the standing valve whereby, by withdrawing the piston, the standing valve and its casing can also be withdrawn for the purpose of making repairs, thereby eliminating the necessity of removing the casing, as heretofore, when repairs to the standing valve have been required.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings

Figure 1:
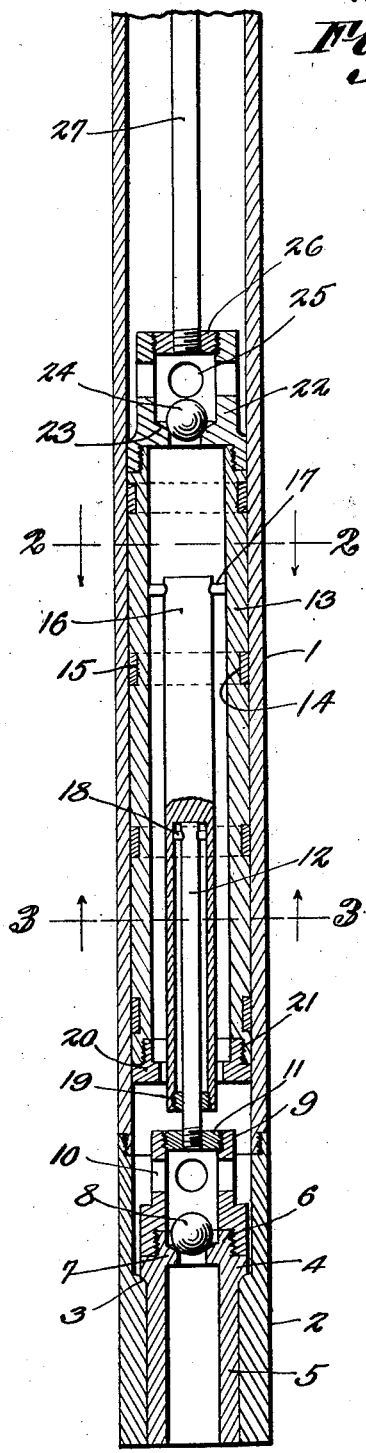
Figure 1 is a longitudinal section through a pump embodying the present improvements.
Figure 2:
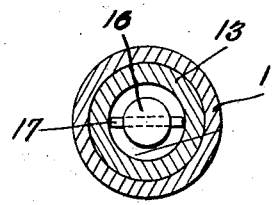
Fig. 2 is a section on line 2—2, Fig. 1.
Figure 3:
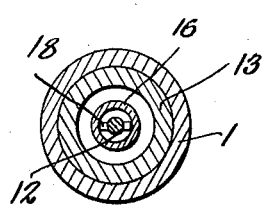
Fig. 3 is a section on line 3—3, Fig. 1.

Referring to the figures by characters of reference 1 designates a casing one section, 2, of which is formed with an interior shoulder 3 adapted to support an annular flange 4 provided on a tubular core 5 fitted snugly within said section 2. This core has a reduced extension 6 at its upper end exteriorly screw threaded and recessed, as at 7 to provide a seat for a ball valve 8. A cage 9 engages the threaded portion 6 of the core and serves to hold the valve properly assembled with the seat. This cage has openings 10 therein, as ordinarily, and the upper end of the cage is preferably closed by means of a threaded plug 11 from which is extended a rod 12.

A tubular piston 13 is slidable within the casing 1 and is formed with annular grooves 14 in which are mounted piston rings 15 preferably of spring metal adapted to expand against the wall of the casing to take up wear. A tubular member 16 is pivotally connected at its upper end to the piston 13 and as shown at 17 and slidably mounted within this tubular member is the upper end portion of the rod 12. This rod has a pin 18 extending diametrically therethrough and a ring 19 is screwed into the lower end of the tubular member 16 to constitute a retainer for the pin 18. Thus it will be seen that rod 12 is held against withdrawal from the tubular member 16 although said tubular member is free to reciprocate upon the rod. The lower end of the piston 13 is engaged by a ring 20 having a screw threaded boss 21 engaging in the piston 13. This ring is spaced from and extends around the telescopic connection made up of the rod 12 and the tubular member 16.

A cage 22 is connected to the upper end of the piston and has a seat 23 on which a ball valve 24 is normally supported. This cage has the usual opening 25 and the upper end of the cage is closed by a screw plug 26 from which the pump rod 27 is extended.

It will be apparent that when the piston 13 is reciprocated by means of the rod 27 the tubular member 16 will slide back and forth upon the rod 12 without disturbing the standing valve made up of the parts 5, 8 and 9. During each down stroke of the piston the liquid stops above the valve 8 will be allowed to pass through the piston and outwardly through the cage 22. During the upstroke of the piston valve 24 will close and valve 8 will be opened by the inflow of fluid through the core 5 in the cage 9.

Should it be desired to withdrawn the standing valve for the purpose of making repairs, etc., it is merely necessary to pull the piston out of the casing 1. This will cause the tubular member 16 to pull on the rod 12, which, in turn, will lift the cage 9 and core 5 from their normal positions so that they will be pulled from the casing.

Thus it is necessary to pull the entire casing as heretofore when repairs to the standing valve have been necessary.

What is claimed is:—

In a pump the combination with a casing and a standing valve connected thereto, a tubular piston fitted snugly within the casing, piston rings carried by said piston for sliding engagement with the piston, a cage connected to the upper end of the piston, a valve therein for closing the upper end of the piston during the upstroke thereof, the lower end of the piston being open, a tubular member within and pivotally connected to the piston, and a telescopic connection between said tubular member and the standing valve.

In testimony that I claim the foregoing as my own, I have hereto affixed my signature.

JESS A. WRIGHT.